(12) United States Patent
Luo et al.

(10) Patent No.: US 12,331,259 B2
(45) Date of Patent: Jun. 17, 2025

(54) FLAMMABLE AND FIRE-RESISTANT CARBONACEOUS HEAT SOURCE, METHOD FOR PREPARING SAME AND USE THEREOF

(71) Applicant: CHINA TOBACCO HUBEI INDUSTRIAL CORPORATION LIMITED, Wuhan (CN)

(72) Inventors: Chenghao Luo, Wuhan (CN); Dan Li, Wuhan (CN); Long Huang, Wuhan (CN); Hao Liu, Wuhan (CN); Yikun Chen, Wuhan (CN); Jian Zhang, Wuhan (CN); Zean Wang, Wuhan (CN)

(73) Assignee: CHINA TOBACCO HUBEI INDUSTRIAL CORPORATION LIMITED, Wuhan (CN)

( * ) Notice: Subject to any disclaimer, the term of this patent is extended or adjusted under 35 U.S.C. 154(b) by 559 days.

(21) Appl. No.: 17/775,637

(22) PCT Filed: Oct. 26, 2020

(86) PCT No.: PCT/CN2020/123682
§ 371 (c)(1),
(2) Date: Sep. 14, 2022

(87) PCT Pub. No.: WO2021/114899
PCT Pub. Date: Jun. 17, 2021

(65) Prior Publication Data
US 2023/0242828 A1   Aug. 3, 2023

(30) Foreign Application Priority Data

Dec. 11, 2019   (CN) .......................... 201911263915.0

(51) Int. Cl.
*C10L 5/44*  (2006.01)
*A24D 1/00*  (2020.01)
(Continued)

(52) U.S. Cl.
CPC .............. *C10L 5/447* (2013.01); *A24D 1/002* (2013.01); *A24D 1/22* (2020.01); *C10L 5/14* (2013.01);
(Continued)

(58) Field of Classification Search
CPC .. A24D 1/002; A24D 1/22; C10L 5/14; C10L 5/447; C10L 2270/08; C10L 2290/08; C10L 2290/30
See application file for complete search history.

(56) References Cited

U.S. PATENT DOCUMENTS 5,076,296 A * 12/1991 Nystrom .................. A24C 5/00
131/194
5,551,451 A *  9/1996 Riggs ....................... A24D 1/22
131/194

(Continued)

FOREIGN PATENT DOCUMENTS

CH        718303 B1    6/2024
CN       87101955 A    2/1988

(Continued)

OTHER PUBLICATIONS

English-language machine translation of KR 2009007763 A (Year: 2009).*
PCT Search Report for PCT International Patent Application No. PCT/CN2020/123682.
Translated CN Office Action; Application No. 201911263915.0; Dated Aug. 2, 2021., Entire document.

*Primary Examiner* — James C Goloboy
(74) *Attorney, Agent, or Firm* — BOND, SCHOENECK & KING, PLLC; George R. McGuire

(57) ABSTRACT

Embodiments provide a flammable and fire-resistant carbonaceous heat source and a method and a use for the same. In the embodiments, the flammable and fire-resistant carbonaceous heat source of the present disclosure includes flammable carbon, flame-retardant carbon and a binder, wherein, the flame-retardant carbon includes graphite, the binder
(Continued)

includes glutinous rice glue, and based on a total weight of the flammable and fire-resistant carbon heat source, a content of the flammable carbon, the flame-retardant carbon and the binder is 40-75 wt %, 10-45 wt % and 3-15 wt %, respectively. The method for preparing the flammable and fire-resistant carbonaceous heat source of the present disclosure includes the following steps: mixing the flammable carbon, the flame-retardant carbon, and the binder in a content ratio; extruding and shaping a resulting mixture; and drying a resulting mixture.

14 Claims, 2 Drawing Sheets

(51) Int. Cl.
  *A24D 1/22*  (2020.01)
  *C10L 5/14*  (2006.01)
(52) U.S. Cl.
  CPC ....... *C10L 2270/08* (2013.01); *C10L 2290/08* (2013.01); *C10L 2290/30* (2013.01)

(56) References Cited

U.S. PATENT DOCUMENTS

| | | |
|---|---|---|
| 8,617,263 B2 | 12/2013 | Banerjee et al. |
| 2011/0180082 A1 | 7/2011 | Banerjee et al. |
| 2017/0000188 A1* | 1/2017 | Nordskog ............... A24D 1/002 |
| 2021/0235742 A1* | 8/2021 | Lei ........................ C10L 5/447 |

FOREIGN PATENT DOCUMENTS

| | | | | |
|---|---|---|---|---|
| CN | 1087497 A | | 6/1994 | |
| CN | 1093556 A | | 10/1994 | |
| CN | 103619198 A | | 3/2014 | |
| CN | 104522882 A | | 4/2015 | |
| CN | 104585884 A | | 5/2015 | |
| CN | 105018178 A | | 11/2015 | |
| CN | 108024568 A | | 5/2018 | |
| CN | 109222210 A | * | 1/2019 | ........... A24B 15/165 |
| JP | H10179112 A | | 7/1998 | |
| KR | 20090077663 A | * | 7/2009 | |

* cited by examiner

FLAMMABLE AND FIRE-RESISTANT CARBONACEOUS HEAT SOURCE, METHOD FOR PREPARING SAME AND USE THEREOF

CROSS-REFERENCE TO RELATED PATENT APPLICATIONS

The present disclosure claims priority to Chinese Patent Application No. 201911263915.0, titled FLAMMABLE AND FIRE-RESISTANT CARBONACEOUS HEAT SOURCE, METHOD FOR PREPARING SAME AND USE THEREOF, filed on Dec. 11, 2019, which is incorporated herein by reference.

TECHNICAL FIELD

The present disclosure belongs to the field of formed carbonaceous fuel, and more particularly, the present disclosure generally relates to a flammable and fire-resistant carbonaceous heat source, a method for preparing the same and a use thereof.

BACKGROUND

New tobacco products will be the third major change in the tobacco industry. At present, new tobacco products can be mainly divided into three categories: electronic cigarettes, heatable tobacco products and smokeless tobacco products. The basic principle of the heatable tobacco products is that there is no need to burn, but only by heating the cut tobacco to bake out the nicotine and flavor substances in the tobacco, so as to meet the needs of smokers. There are two main types of heated tobacco products: electric heating products and fuel heating products. Comparatively speaking, the development of electric heating technology is relatively mature, and the corresponding products have been commercialized earlier in the foreign tobacco market, occupying a dominant market position. Fuel heating products are still in the development stage, and the fuels used are solid, liquid and gaseous, and most of them are solid fuels. The solid fuel is mainly carbon-containing material. A small section of carbon rod is provided at the head of the charcoal-heated cigarette. After the carbon rod is ignited, the heat generated by the combustion of the carbon rod is transferred to the tobacco behind, and the tobacco releases smoke after being heated.

Compared with electric heat-not-burn cigarettes, carbon heat-not-burn cigarettes are more similar to traditional cigarettes in appearance and usage, and do not require charging and complicated auxiliary equipment. Reynolds first began to study carbon rod heatable tobacco products. In 1988, Reynolds developed the world's first carbon-heatable tobacco product, namely Premier, and then successively launched Eclipse, revo and other products. Philip Morris and Japan Tobacco have followed suit to develop carbon heat-not-burn tobacco products. However, no mature products have been sold on a large scale in the market so far. As for a carbon heat-not-burn heat source, the combustion characteristics of carbon rods play a key role in the consumer's smoking experience. In the existing patent reports, the carbon rod is mainly composed of various carbonaceous raw materials, binders, combustion accelerants and other auxiliary additives through compounding and extrusion shaping.

A combustible heat source for smoking articles as described in Chinese Patent No. CN103619198B, comprising carbon and at least one ignition aid selected from a group consisting of metal nitrates, chlorates, peroxides, thermite materials, intermetallic materials, magnesium, zirconium, and combinations thereof. The binders adopted include one or more organic binders selected from the group consisting of viscose, methyl cellulose, carboxymethyl cellulose, hydroxypropyl cellulose, hydroxypropyl methyl cellulose, wheat flour, starch, sugar, rapeseed oil and combinations thereof; one or more inorganic binders selected from the group consisting of clays, aluminum silicate derivatives, alkali excited aluminum silicates, alkaline silicates, limestone derivatives, alkaline earth metal compounds, and aluminum compounds. As described in Chinese Patent No. CN87101955A, a method for preparing carbonaceous fuel for smoking articles and the products made therefrom, using high-temperature pyrolysis of cellulose materials such as hardwood paper, kraft paper, or solid products obtained from wood, tobacco leaves, coconut, etc. as a carbon source, and the binder adopted is formed by mixing, squeezing and drying in sequence SCMC, gum, CMC, starch, alginate and polyvinyl alcohol.

SUMMARY

The present disclosure is intended to provide a carbonaceous heat source that can be used in heat-not-burn smoking products to meet various requirements for smoking, aiming at the deficiencies in the prior art; in addition, the carbonaceous heat source can also be used as a type of carbon material, providing heat source for heating and cooking food in people's lives.

In order to achieve the above object, in one aspect, the present disclosure provides flammable and fire-resistant carbonaceous heat source, comprising flammable carbon, flame-retardant carbon and a binder, wherein, the flame-retardant carbon comprises graphite, the binder comprises glutinous rice glue, and based on a total weight of the flammable and fire-resistant carbon heat source, a content of each of the flammable carbon, the flame-retardant carbon and the binder is 40-75 wt %, 10-45 wt % and 3-15 wt %.

In another aspect, the present disclosure also provides a method for preparing the above-mentioned flammable and fire-resistant carbonaceous heat source, which comprises the following steps: mixing the flammable carbon, the flame-retardant carbon and the binder with the content ratios; extruding and shaping a resulting mixture; and drying the resulting mixture.

In yet another aspect, the present disclosure also provides a use of the above flammable and fire-resistant carbonaceous heat source in heat-not-burn smoking articles.

Compared with the prior art, the carbon rod made by the flammable and fire-resistant carbonaceous heat source of the present disclosure has at least the following outstanding advantages:

(1) The glutinous rice glue prepared from natural glutinous rice is selected as the main binder, and a small amount of inorganic binder is added to form a composite binder, such that the high strength and compactness of the shaped carbon rod can be insured, and the binder is environmentally friendly, such that the carbon rod is safe and non-toxic;

(2) The flammable carbon and the flame-retardant carbon are blended, and at the same time, since the flammable carbon are easy to ignite and the flame-retardant carbon has strong fire resistance, it can ensure the dual advantages of the carbon rods of flammability and combustion;

(3) Food-grade organic acid salts of potassium, sodium, calcium or iron are used as modifiers, while chlorides, nitrates, chlorates, and transition metal compounds such as Cu, Mn, Ce, and Cr commonly used in carbon rods are discarded as combustion accelerants, such that physical health risks to smokers can be reduced; and (4) The surface modification method reduces the activation energy of combustion on the surface of the carbon rod, such that the surface of the carbon rod is rapidly red-hot after ignition, which shortens the smoking time and improves the experience of consumers.

BRIEF DESCRIPTION OF DRAWINGS

The accompanying drawings are used to provide a further understanding of the present disclosure, and constitute a part of the specification, and together with the following specific embodiments, are used to explain the present disclosure, but do not constitute a limitation to the present disclosure. In the attached figures.

DESCRIPTION OF EMBODIMENTS

Figure 1:
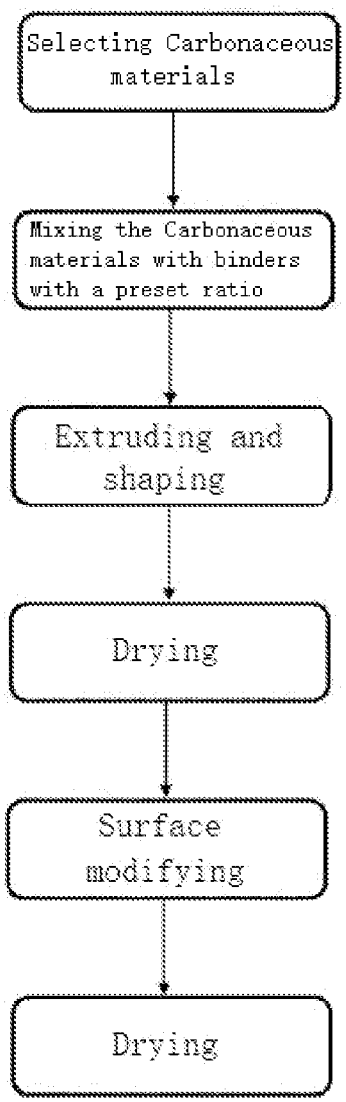
FIG. 1 is a process flow diagram of a method for preparing a flammable and fire-resistant carbonaceous heat source according to an embodiment of the present disclosure.

Specific embodiments of the present disclosure will be described in detail below. It should be understood that the specific embodiments described herein are only used to illustrate and explain the present disclosure, but not to limit the present disclosure.

The endpoints of ranges and any values disclosed herein are not limited to the precise ranges or values, which are to be understood to encompass values proximate to those ranges or values. For ranges of values, one or more new ranges of values can be yielded by combining each other between the endpoints of each range, or between the endpoints of each range and the individual point values, or between the individual point values, the combined ranges should be considered as specifically disclosed herein.

In one aspect, the present disclosure provides a flammable and fire-resistant carbonaceous heat source, comprising flammable carbon, fire-resistant carbon and a binder, wherein the fire-resistant carbon comprises graphite, and the binder comprises glutinous rice gum, based on the total weight of the flammable and fire-resistant carbonaceous heat source, the content of each of the flame-retardant carbon, the fire-resistant carbon and the binder is 40-75% by weight, 10-45% by weight and 3-15% by weight, respectively.

For example, in one embodiment, the content of the flammable carbon may be 45 wt %, 50 wt %, 55 wt %, 60 wt %, 65 wt % or 70 wt % by weight based on the total weight of the flammable and fire-resistant carbonaceous heat source. For example, in one embodiment, the content of the flame-retardant carbon is 15 wt %, 20 wt %, 25 wt %, 30 wt %, 35 wt % or 40% by weight. For example, in one embodiment, the content of the binder is 5 wt %, 7 wt %, 9 wt %, 11 wt % or 13 wt % based on the total weight of the flammable and fire-resistant carbonaceous heat source.

In the embodiments of the present disclosure, different carbonaceous materials are distinguished by the difficulty of burning, as used herein, the terms "flammable carbon" and "flame-retardant carbon" refer to carbonaceous materials with low and high ignition points, respectively. Specifically, in a preferred embodiment, the maximum weight loss peak (thermogravimetric) temperature of the flammable carbon can be 250-549° C. (for example, 300° C., 350° C., 400° C., 450° C. or 500° C.), as determined by thermogravimetric analysis, and the complete burnout temperature may be lower than 650° C. The maximum weight loss peak temperature of the auxiliary carbon source in the flame-retardant carbon may be 551-700° C. (for example, 600° C., 630° C., 660° C. or 690° C.), and the complete burnout temperature can be lower than 800° C.

In another preferred embodiment, the flammable carbon can be fruit charcoal, *chrysanthemum* charcoal, cotton stalk charcoal or tobacco charcoal; the volatile content is higher than 30 wt % (for example, 35 wt %, 37 wt % or 40 wt %) semi-coke obtained from coal pyrolysis; or any other carbon source that satisfies the temperature conditions, or a combination thereof.

In another preferred embodiment, the flame-retardant carbon may further comprise an auxiliary carbon source, and based on the total weight of the flame-retardant carbon, the content of the graphite is higher than 50% by weight, or higher than 60%, 70%, 80%, 90% or 95% by weight. For the auxiliary carbon source, the auxiliary carbon source can be bamboo charcoal, activated carbon, wugang charcoal, white charcoal or binchotan charcoal; semi-coke obtained from coal pyrolysis; or any other carbon source that satisfies the temperature conditions, or a combination thereof.

According to the present disclosure, there is no particular requirement on the physical forms of the flammable carbon and the flame-retardant carbon, as long as they can be mixed to form an flammable and fire-resistant carbon heat source. In a preferred embodiment, the flammable carbon can be powder, and its fineness can be 100-600 meshes; the flame-retardant carbon can be powder, and its fineness can be 200-1250 meshes.

As for the binder of the present disclosure, it is mainly composed of glutinous rice glue, which is an environmentally friendly adhesive formed by using pure natural glutinous rice or sticky rice as raw materials through purifying, grinding and drying processes, thereby ensuring that the binder itself environmentally friendly, safe and non-toxic. In one embodiment, the binder of the present disclosure may contain at least 90% by weight of glutinous rice gum, and in addition, may also contain 0-10% of clay minerals. In a preferred embodiment, the clay minerals include at least one of kaolin, mica and montmorillonite, and the fineness is 200-1250 meshes. In a more preferred embodiment, the clay minerals may be food grade montmorillonite.

In another aspect, the present disclosure also provides a method for preparing the above-mentioned flammable and fire-resistant carbonaceous heat source, which comprises the following steps: (1) mixing the flammable carbon, the flame-retardant carbon, and the binder in the content ratio, (2) extruding and shaping a resulting mixture; and (3) drying the resulting mixture.

In one embodiment, the method of the present disclosure may further include a step of screening the carbonaceous materials used before step (1). Specifically, the screening step may include basic composition analysis of the carbonaceous materials (more specifically, it can be industrial analysis, elemental analysis, calorific value analysis or ash component analysis), thermal comprehensive analysis (more specifically, it can be analyzed through TG, DTG curves and characteristic data points), comprehensive evaluation and determination, etc., so as to screen the flammable carbon and flame-retardant carbon that meet the needs of the present disclosure. In another embodiment, the mixing in step (1) of the method of the present disclosure can be carried out by wet mixing and stirring, and the mixing time can be no less than 5 minutes, so that the raw materials are fully mixed.

The resulting shaped material can be formed into various shapes by the user through the extrusion and shaping step as required. In one embodiment, the shaped material may be in the shape of a rod. In another embodiment, the extrusion and shaping conditions may include a pressure of 2-10 MPa and a temperature of 20-90° C. In another embodiment, the drying may be carried out at a low temperature air flow of 20-60° C., so that the moisture content of the dried shaped material may be reduced to less than 10 wt %.

According to the present disclosure, in order to reduce the activation energy of combustion on the surface of the carbonaceous fuel, so that the surface becomes red hot after being ignited, and the smoke emission time is shortened, the method of the present disclosure (referring to FIG. 1) may further comprise the following steps: (4) modifying the surface of the shaped material with a modifier; and (5) drying the modified shaped material additionally.

The modifying step of the present disclosure can be carried out by various methods, such as dissolving the modifier in water and then spraying it on the surface of the shaped material; or immersing the shaped material in an aqueous solution of the modifier, etc., and the weight ratio of the modifier to water can be 0.2-2:100. In a preferred embodiment, the chlorides, nitrates, chlorates and transition metal compounds such as Cu, Mn, Ce, Cr and other commonly used carbon rods in the past are abandoned, and the modifier of the present disclosure can be food grade organic acid salts of potassium, sodium, calcium and iron, including but not limited to oxalate, acetate, citrate, formate, tartrate, malate. In another preferred embodiment, the additional drying may be carried out at a low temperature air flow of 50-105° C., so that the moisture content of the dried shaped material may be reduced to less than 5% by weight; or may be at co-drying with microwave-assisted air flow at 50-105° C., such that the moisture content of the dried shaped material can be below 5% by weight.

The present disclosure will be described in detail below by means of examples.

Example 1

Figure 2:
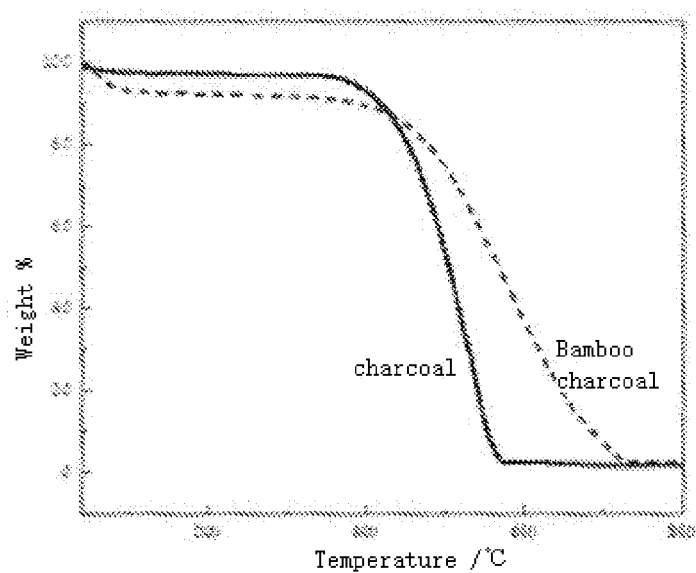
FIG. 2 is a thermogravimetric TG curve of two carbon sources of the flammable and fire-resistant carbonaceous heat source according to an embodiment of the present disclosure.
Figure 3:
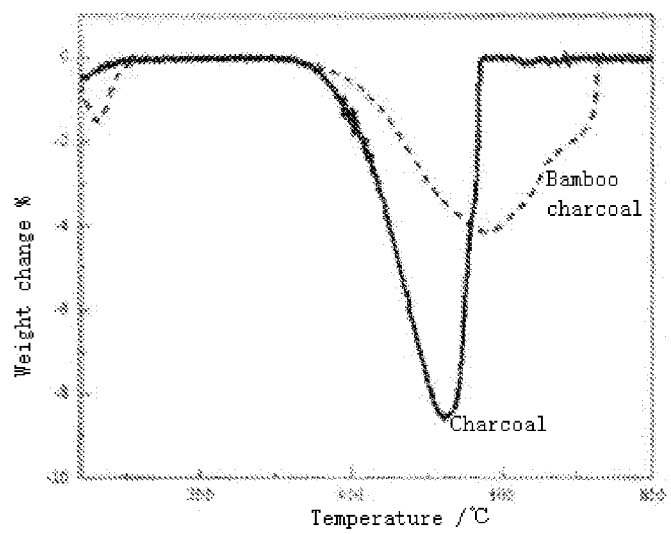
FIG. 3 is a thermogravimetric DTG curve of two carbon sources of a flammable and fire-resistant carbonaceous heat source according to an embodiment of the present disclosure.

A kind of charcoal and bamboo charcoal are selected, pulverized and ground, then then, they are put in a 100-mesh sieve, and an industrial analyzer is adopted to analyze the content of moisture, volatile matter, fixed carbon and ash (Table 1). The results show that the ash content of fruit charcoal is 3.3%, the ash content of bamboo charcoal is 2.8%; the content of carbon element is higher than 85%, and the content of sulfur and nitrogen is lower than 0.4%, as determined by an elemental analyzer. The ash content of the charcoal and bamboo charcoal after combustion is tested by XRF. It shows that the main oxide components are silicon dioxide, calcium oxide, magnesium oxide, iron oxide and aluminum oxide (Table 2) The calorific value is 28-30 MJ/kg analyzed by automatic calorimeter. The TG (FIG. 2) and DTG curves (FIG. 3) are obtained by using the thermal comprehensive analyzer. The burnout temperatures of the charcoal and bamboo charcoal are found to be 559° C. and 724° C., respectively, and the maximum weight loss peak temperatures are 510° C. and 578° C., respectively. According to the above test results, the charcoal is selected as the flammable carbon, and the bamboo charcoal is selected as the auxiliary carbon source of the flame-retardant carbon.

TABLE 1

| Carbon source | Ash % | Carbon element % | Sulfur element % | Nitrogen element % | Calorific value MJ/kg |
| --- | --- | --- | --- | --- | --- |
| Charcoal | 3.3 | 86.5 | 0.01 | 0.28 | 30.1 |
| Bamboo charcoal | 2.8 | 85.7 | 0.12 | 0.35 | 29.5 |

TABLE 2

| Carbon source | $SiO_2$ % | CaO % | $Al_2O_3$ % | $Fe_2O_3$ % | MgO % |
| --- | --- | --- | --- | --- | --- |
| Charcoal | 40.2 | 26.5 | 5.8 | 10.6 | 4.8 |
| Bamboo charcoal | 37.1 | 11.7 | 1.5 | 3.0 | 3.2 |

The charcoal of 30 parts by weight of 100 meshes, the bamboo charcoal of 15 parts by weight of 200 meshes, the graphite powder of 15 parts by weight of 1250 meshes, the montmorillonite powder of 1.5 parts by weight of 1250 meshes, the water-free glutinous rice glue of 13.5 parts by weight of 200 meshes, and 25 parts of the water by weight are mixed and stirred uniformly in a mixer, and aged for 10 minutes. The carbon rod is extruded by a screw extruder, and the extrusion shaping pressure is 2 MPa and the temperature is 85° C., and the extruded carbon rod is dried in air flow, the air temperature is kept at 60° C., the moisture content of the carbon rods after drying is less than 10%. 2 parts by weight of potassium malate are dissolved in 100 parts by weight of water, then the carbon rod is immersed in the solution for no less than 2 seconds, and then taken out; the droplets on the surface of the carbon rod are blown off; and then the carbon rod is put into the microwave heating chamber. The power of the microwave is adjusted to ensure that the temperature of the air flowing in the heating chamber is 105° C., and the moisture content of the carbon rod after drying is less than 5%.

Example 2

Cotton stalk carbon and a semi-coke obtained by pyrolysis at 700° C. after washing with a coal with high volatile content and low ash content in western China, and they are pulverized and ground, and then put in a 600-mesh sieve. Testing and determining are performed using the carbonaceous material screening method described in Example 1. According to the test results, both cotton stalk carbon and the semi-coke are selected as flammable carbon.

The cotton stalk charcoal of 40 parts by weight of 600 meshes, the semi-coke of 20 parts by weight of 600 meshes, the graphite powder of 15 parts by weight of 600 meshes, the water-free glutinous rice glue of 5 parts by weight of 600 meshes, and the water of 20 parts by weight are mixed and stirred evenly in the mixer, and aged for 20 minutes. The carbon rod is extruded by the screw extruder, and the extrusion shaping pressure is 8 MPa and the temperature is 85° C., and the extruded carbon rod is dried in air flow, the air temperature is kept at 25° C., the moisture content of the carbon rods after drying is less than 10%. 0.5 parts by weight of potassium sodium tartrate are dissolved in 100 parts by weight of water, then a sprayer is adopted to spray the potassium sodium tartrate aqueous solution on the surface of the carbon rod, the number of sprays is not less than 1 time. After the spraying is completed, the droplets on the surface of the carbon rod are blown off. Then the carbon rod is put into a hot air drying furnace, the hot air temperature is adapted to 55° C., and the moisture content of the carbon rod after drying is less than 5%.

Example 3

Coconut shell activated carbon and tobacco carbon obtained by pyrolysis of a certain tobacco industry waste at 600° C. are selected, pulverized and ground. They are put in a 400-mesh sieve. Testing and determining are performed using the carbonaceous material screening method described in Example 1. According to the test results, both Coconut shell activated carbon is selected as the auxiliary carbon source for the flame-retardant carbon, and tobacco carbon is selected as the flammable carbon.

Tobacco charcoal in 40 parts by weight of 400 meshes, activated carbon in 6 parts by weight of 400 meshes, graphite powder in 14 parts by weight of 800 meshes, water-free glutinous rice glue in 9.5 parts by weight of 400 meshes, kaolin of 0.5 parts by weight of 200 meshes, 30 parts by weight of water are mixed and stirred evenly in the mixer, and aged for 60 minutes. The carbon rod is extruded by a screw extruder. The extrusion shaping pressure is 3 MPa and the temperature is 50° C., and the extruded carbon rod is dried in air flow, the air temperature is kept at 40° C., the moisture content of the carbon rods after drying is less than 10%. 1 part by weight of sodium oxalate is dissolved in 100 parts by weight of water, then the carbon rod is immersed in the solution for no less than 2 seconds and taken out, the droplets on the surface of the carbon rod are blown off, and then the carbon rod is put into a hot air drying furnace, the hot air temperature is adapted to 85° C., and the moisture content of the carbon rod after drying is less than 5%.

Example 4

Fruit charcoal, *chrysanthemum* charcoal, wugang charcoal, deashed anthracite char fired in a charcoal kiln are selected, pulverized and ground, then out in a 500-mesh sieve. Testing and determining are performed using the carbonaceous material screening method described in Example 1. According to the test results, both fruit charcoal and *chrysanthemum* charcoal are selected as flammable carbon; and both wugang charcoal and the deashed anthracite char are selected as auxiliary carbon sources for flame-retardant carbon.

The fruit charcoal of 27 parts by weight of 500 meshes, the *chrysanthemum* charcoal of 27 parts by weight of 500 meshes, the graphite powder of 10.5 parts by weight of 500 meshes, the wugang charcoal of 3 parts by weight of 500 meshes, the deashed anthracite char of 4.5 parts by weight of 500 meshes, 20 parts by weight of water, 6 parts by weight of 500 meshes of water-free glutinous rice glue, 1 part by weight of mica powder of 500 meshes, and 1 part by weight of montmorillonite powder of 500 meshes are mixed and stirred in a mixer, and aged for 5 minutes. The carbon rod is extruded by the screw extruder, and the extrusion shaping pressure is 10 MPa and the temperature is 70° C., and the extruded carbon rod is dried in air flow, the air temperature is kept at 50° C., the moisture content of the carbon rods after drying is less than 10%. 1 part of potassium citrate and 1 part of ferric acetate are dissolved in 100 parts of water, then a sprayer is adopted to spray the solution on the surface of the carbon rod, and the number of sprays is not less than 1 time. After the spraying is completed, the droplets on the surface of the carbon rod are blown off, then the carbon rod is put into the microwave heating chamber, the power of the microwave is adapted to ensure that the temperature of the air flowing in the heating chamber is at 80° C., and the moisture content of the carbon rod after drying is less than 5%.

The 4-5 mm carbon rods prepared in the above-mentioned Examples 1-4 are selected to carry out a combustion test in the air to determine whether the carbonaceous heat source of the present disclosure has the performance in terms of inflammability and combustion resistance. The specific test results of each parameter are shown in the following Table 3. Among them, "surface burning rate (cm/min)" is the moving rate of the red-hot burning line on the surface of the carbon rod, that is, the faster the surface burning rate, the easier combustion, and the "overall burning rate (cm/min)" refers to the reciprocal of the burning time per unit length of carbon rod, that is, the slower the overall burning rate, the longer the burning time.

TABLE 3

| No. | Ignited directly by the lighter? | Ignite time of the lighter in air | Surface burning rate of carbon rod in air | Overall burning rate of carbon rod in air |
| --- | --- | --- | --- | --- |
| Exp. 1 | Yes | <9 s | >1 cm/min | <0.25 cm/min |
| Exp. 1 | Yes | <6 s | >1 cm/min | <0.25 cm/min |
| Exp. 1 | Yes | <7 s | >1 cm/min | <0.35 cm/min |
| Exp. 1 | Yes | <5 s | >1 cm/min | <0.4 cm/min |

It can be seen from the results in Table 3 that the carbonaceous heat source of the present disclosure can be quickly ignited by a fire source in air, and have a high surface combustion rate in air (that is, it has flammability), and have a low overall combustion rate in air (that is, it has burning resistance), which fully meets various requirements for smoking. Accordingly, when it is used for heat-not-burn smoking products, the user's experience can be greatly improved.

The preferred embodiments of the present disclosure are described in detail above, but the present disclosure is not limited to the specific details of the above-mentioned embodiments. Within the scope of the technical concept of the present disclosure, various simple modifications can be made to the technical solutions of the present disclosure. All these simple modifications belong to the protection scope of the present disclosure.

In addition, it should be noted that the specific technical features described in the above-mentioned specific embodiments can be combined in any suitable manner unless they are inconsistent. In order to avoid unnecessary repetition, various possible combinations are not described in the present disclosure.

Furthermore, the various embodiments of the present disclosure can also be combined arbitrarily, as long as they do not violate the spirit of the present disclosure, they should also be regarded as the contents disclosed in the present disclosure.

What is claimed is:

1. A flammable and fire-resistant carbonaceous heat source, comprising flammable carbon, flame-retardant carbon and a binder, wherein,
   the flame-retardant carbon comprises graphite and an auxiliary carbon source, the binder comprises glutinous rice glue, and based on a total weight of the flammable and fire-resistant carbon heat source, a content of each of the flammable carbon, the flame-retardant carbon and the binder is 40-75 wt %, 10-45 wt % and 3-15 wt %;

a maximum weight loss peak temperature of the flammable carbon is 250-549° C. as determined by thermogravimetric analysis, and a complete burnout temperature is lower than 650° C.;

the flame-retardant carbon is carbonaceous materials with higher ignition points than that of the flammable carbon;

a maximum weight loss peak temperature of the auxiliary carbon source in the flame-retardant carbon is 551-700° C. as determined by thermogravimetric analysis, and a complete burnout temperature is lower than 800° C.

2. The flammable and fire-resistant carbonaceous heat source according to claim 1, wherein,
the flammable carbon is selected from a group consisting of fruit charcoal, *chrysanthemum* charcoal, cotton stalk charcoal and tobacco charcoal; semi-coke obtained by pyrolysis of coal with a volatile content higher than 30% by weight; or a combination thereof.

3. The flammable and fire-resistant carbonaceous heat source according to claim 1, wherein,
the flammable carbon is powder, with a fineness of 100-600 mesh.

4. The flammable and fire-resistant carbonaceous heat source according to claim 1, wherein, a content of the graphite is higher than 50 wt % based on the total weight of the flame-retardant carbon.

5. The flammable and fire-resistant carbonaceous heat source according to claim 1, wherein, the auxiliary carbon source is selected from a group consisting of bamboo charcoal, activated carbon, wugang charcoal, white charcoal and binchotan charcoal; semi-coke obtained by pyrolysis of coal with a volatile content less than 30% by weight; or a combination thereof.

6. The flammable and fire-resistant carbonaceous heat source according to claim 1, wherein,
the flame-retardant carbon is powder, with a fineness of 200-1250 mesh.

7. The flammable and fire-resistant carbonaceous heat source according to claim 1, wherein,
the binder further comprises 0-10% by weight of clay minerals based on the total weight of the binder.

8. The flammable and fire-resistant carbonaceous heat source according to claim 7, wherein,
the clay minerals comprise at least one of kaolin, mica and montmorillonite, and with a fineness of 200-1250 mesh.

9. A method for preparing the flammable and fire-resistant carbonaceous heat source according to claim 1, comprising steps of:
mixing the flammable carbon, the flame-retardant carbon, and the binder in a content ratio;
extruding and shaping a resulting mixture; and
drying the resulting mixture.

10. The method according to claim 9, wherein,
conditions of the extruding and shaping comprise a pressure of 2-10 MPa and a temperature of 20-90° C.

11. The method according to claim 9, wherein,
the drying is performed in a low temperature air stream at 20-60° C., to reduce a moisture content of a dried shaped material to less than 10% by weight.

12. The method according to claim 9, further comprising the steps of:
(4) modifying a surface of the shaped material with a modifier, and
(5) subjecting a modified shaped material to additional drying.

13. The method according to claim 12, wherein,
the modifier is a food grade organic acid salt of potassium, sodium, calcium or iron, including but not limited to oxalate, acetate, citrate, formate, tartrate or malate.

14. The method according to claim 12, wherein,
the additional drying is performed in a low temperature air stream at 50-105° C., to reduce a moisture content of a dried shaped material to less than 5% by weight.

* * * * *